United States Patent Office 3,436,974
Patented Apr. 8, 1969

3,436,974
CRANK ASSEMBLY FOR POWER STEERING
Heinrich Wagner and Erich Jablonsky, Schwabisch Gmund, Germany, assignors to Zahnradfabrik Friedrichshafen Aktiengesellschaft, a corporation of Germany
Filed Mar. 2, 1967, Ser. No. 620,183
Claims priority, application Germany, Mar. 4, 1966, Z 12,071
Int. Cl. F16h 21/44
U.S. Cl. 74—105                                    7 Claims

ABSTRACT OF THE DISCLOSURE

The invention relates to booster power steering systems in which a pressure operated piston is connected to a crank arm which in turn operates the steering linkage. The particular invention pertains to a means for connecting the piston to the crank arm in such a manner that final assembly between those elements can be accomplished by providing access at the end of the cylinder housing in which the piston slides. More particularly, the invention provides for a single access opening laterally of a substantially closed end of a cylinder housing through which a pintle member, such as a pin, can be inserted to effect a connection, or withdrawn for purposes of disassembly.

Field of the invention

The invention pertains to the automotive field wherein booster power steering systems are utilized, particularly systems which use hydraulically operated pistons.

Description of the prior art

The prior art provides various means for assemblying or connecting the piston to the steering linkage mechanism via a crank arm wherein the cylinder housing requires at least two openings for effecting assembly and disassembly.

Summary of the invention

The invention comprises a cylinder housing of which one end is open for insertion of the booster piston and the other end of which is bulbously formed to serve as a housing for the connecting means between the piston and the crank arm which rotates a stub shaft for actuation of the steering linkage which is exterior of the housing. By means of a link pivotally connected to the end of the piston and to the free end of the crank arm force transmission is effected from piston to crank arm. This link is articulated to the piston by means of a pintle, or bearing pin, which passes through aligned bores of the link and the piston and by an identical pin passing through aligned bores of the link and the crank arm. The bulbous end of the housing is provided with a lateral opening which gives access to the latter pin and which is normally capped. The housing may be opened by removal of the cap and such opening constitutes the only lateral aperture in the housing. Through such opening the link and crank arm can be articulated by insertion of the pin through the respective bores, utilizing a snap ring for retention of the pin. Extraction of the pin may be readily accomplished by removal of the snap ring and gripping of the pin with a tool on a protuberance integral with the pin.

Description of the invention

Figure 2:
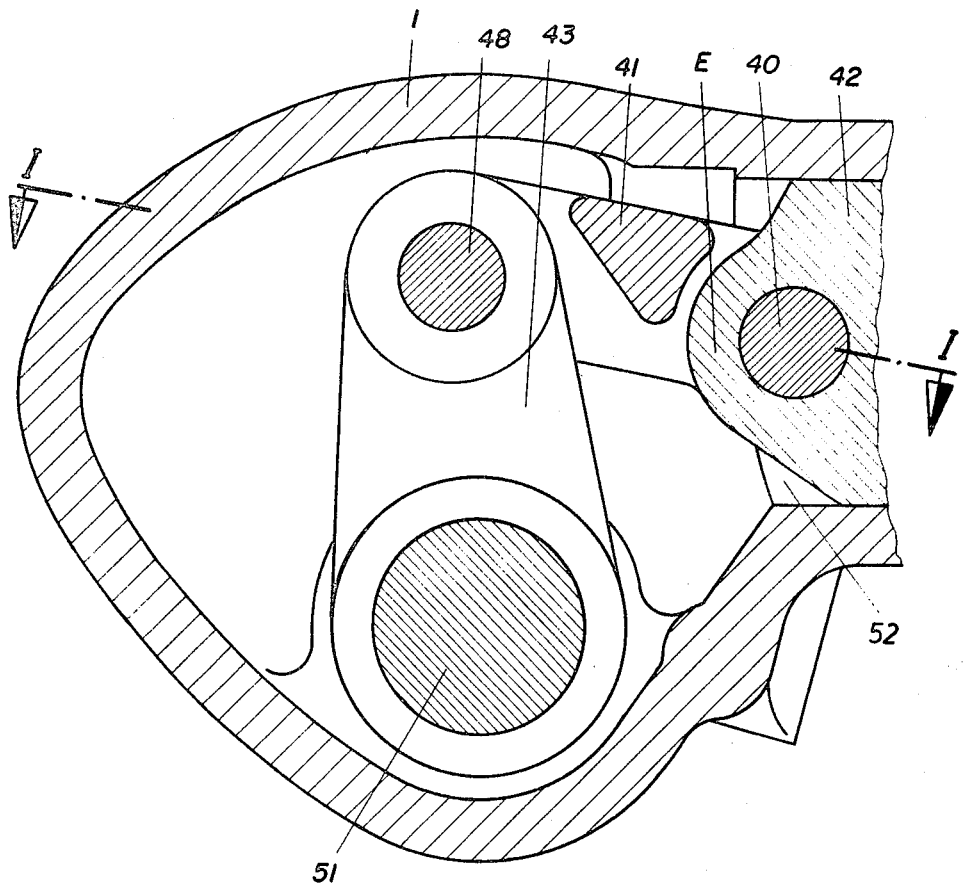
FIG. 2 is a fragmentary cross section in elevation.

Referring to the drawing, a housing 1 is illustrated, FIG. 2 showing the outer end of the housing being bulbously formed for the purpose of accommodating a crank arm 43 operated by a link 41 to rotate a stub shaft 51 which will be understood to actuate the exteriorally disposed parts of the steering mechanism. The housing is for the most part a cylinder housing in which the booster pressure piston 42 reciprocates in a manner well understood to persons skilled in the art.

Figure 1:
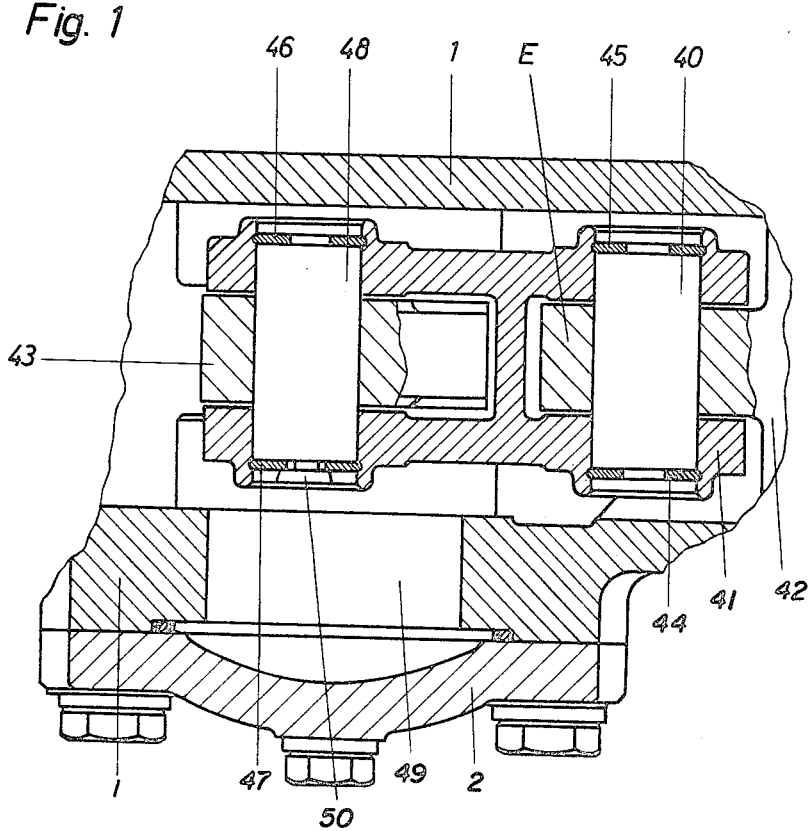
FIG. 1 is a fragmentary cross section through 1—1 of FIG. 2, in plan view of the components of the invention.

The link 41 is provided with a pair of cheeks at each end, clearly visible in FIG. 1 and the crank arm 43 is inserted between the outer pair of cheeks while an ear E extending from the piston and integral therewith is accommodated between the other pair of cheeks. The crank arm has a bearing pin 48 extending across the bores of the respective cheeks and the crank arm while the ear E has a pin 40 extending through the bores of the other pair of cheeks and the ear. Each pin is retained endwise by a snap ring at each end. Thus, the snap rings 45 and 46 retain one end of the respective pins and the snap rings 44 and 47 retain the other ends. The pin 48 is provided with an undercut stud or peg 50 which can be gripped by any suitable tool of a collet type or the like for withdrawing the pin through a lateral opening 49 in the housing which is normally closed by a bolted cap 2 which is fastened to the housing, as will be evident from FIG. 1.

In order to assemble the elements the link is first articulated to the piston and then the piston slid into place through its cylinder bore. At that time all snap rings are in place except for the snap ring 47. This step serves to position the bore of the crank arm intermediate the bores of the adjacent link cheeks and at that time pin 48 may be inserted and locked in place by means of the pin 47. It will be noted that such final assembly step can be accomplished through the single opening 49 and then cap 2 fastened in place. For disassembly the cap 2 is removed, the snap ring 47 is removed, and a suitable tool utilized to grip the peg 50 for withdrawing the pin 48.

From the above description it will be apparent that the purposes of the invention are clearly met by a simple, economical and rugged construction wherein only a single opening for assembly and disassembly of the piston to the steering crank arm is required.

We claim:

1. In a power steering mechanism, an elongated housing, a crank arm therein, a piston in said housing, said piston being axially insertable into said housing through one end thereof and the other end of said housing being substantially closed having a lateral normally closed opening at one side and being integral at the other side opposite said opening; and connecting means for transmitting force from said piston to said crank arm comprising a link having an end pivotally connected to said piston and an opposite end pivotally connected to said crank arm adjacent said opening, means for effecting said pivotal connections, said housing opening being large enough to provide access to the pivotal connection means at said opposite end of said link for assembly and disassembly thereof.

2. In a power steering mechanism as set forth in claim 1, said latter pivotal connection means comprising bores in said crank arm and said link, a pin through said bores, retaining means at each end of said pin for retaining said pin in said bores.

3. In a power steering mechanism as set forth in claim 2, said pin being provided with means to be gripped so as to be extricated from said bores.

4. In a power steering mechanism as set forth in claim 3, including a sealing closure cap for normally closing said housing opening.

5. In a power steering mechanism as set forth in claim 1, the latter pivotal connection means comprising a pair of cheeks on said link and having aligned bores, said crank arm being disposed intermediate said cheeks and having a bore aligned with said cheek bores, a pin disposed through said bores and a retainer member carried by each of said cheeks to retain said pin.

6. In a power steering mechanism as set forth in claim 5, said retainer members being snap rings disposed at opposite sides of said pin, said pin having a tool receiving means at the end adjacent said opening and the axis of said pin being substantially normal to the plane of said opening.

7. In a power steering mechanism as set forth in claim 6, the pivotal connection means for connecting said piston to said link comprising an additional pair of cheeks on said link, said piston having an axially protruding member extending therefrom intermediate said additional cheeks and said member and said additional cheeks being provided with aligned bores, a pin through said latter bores, and a snap ring in each of said additional cheeks for retaining said pin.

References Cited

UNITED STATES PATENTS 2,847,238  8/1958  Bolling _____ 85—8.8
3,023,629  3/1962  Wagner et al. _____ 74—105

FREDERICK L. MATTESON, Jr., *Primary Examiner.*

E. G. FAVORS, *Assistant Examiner.*